Figure 1:
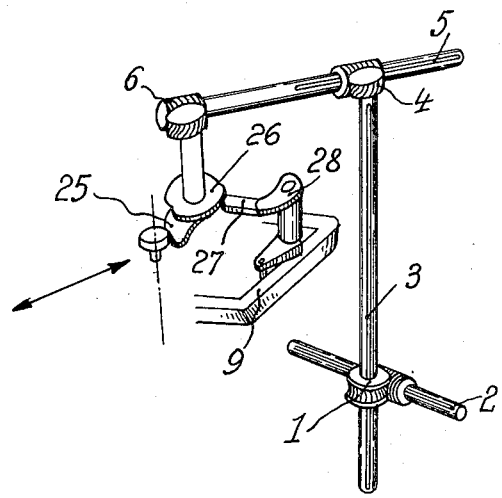

Dec. 1, 1953  M. M. ESCURE  2,660,737
LATHE ATTACHMENT FOR PROGRESSIVELY CUTTING A THREAD
Filed May 4, 1948  5 Sheets-Sheet 1

INVENTOR
MARCEL M. ESCURE
By Young, Emery & Thompson
Att'ys.

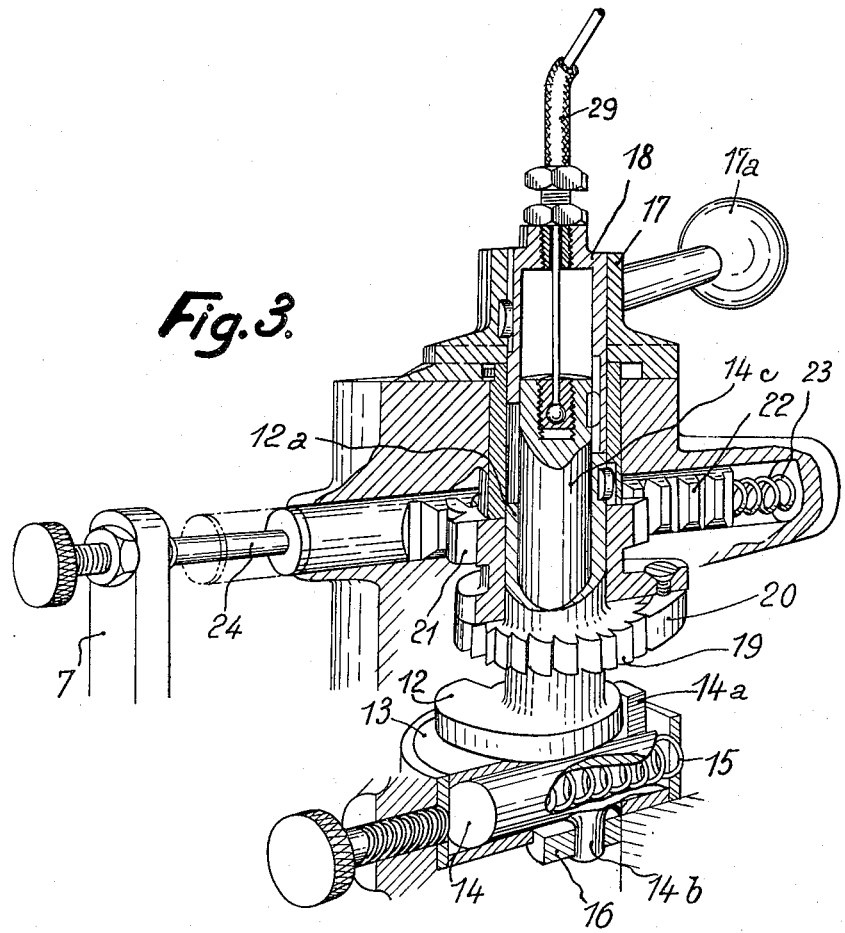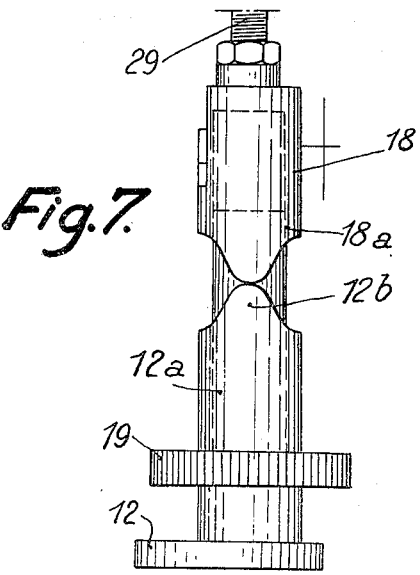

Dec. 1, 1953  M. M. ESCURE  2,660,737
LATHE ATTACHMENT FOR PROGRESSIVELY CUTTING A THREAD
Filed May 4, 1948  5 Sheets-Sheet 3

INVENTOR
MARCEL M. ESCURE

Dec. 1, 1953   M. M. ESCURE   2,660,737
LATHE ATTACHMENT FOR PROGRESSIVELY CUTTING A THREAD
Filed May 4, 1948   5 Sheets-Sheet 4
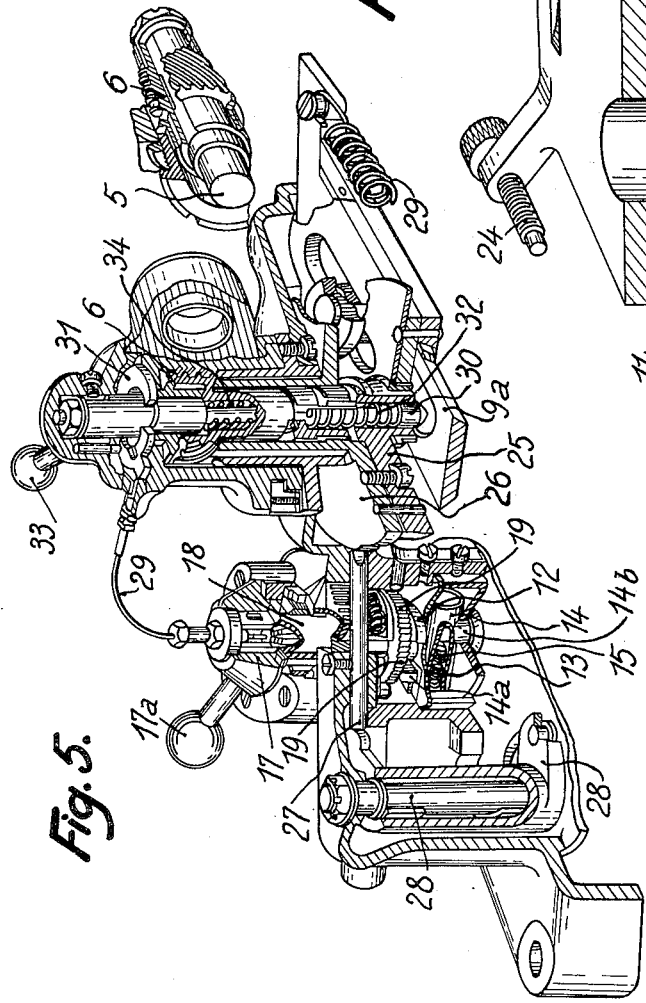

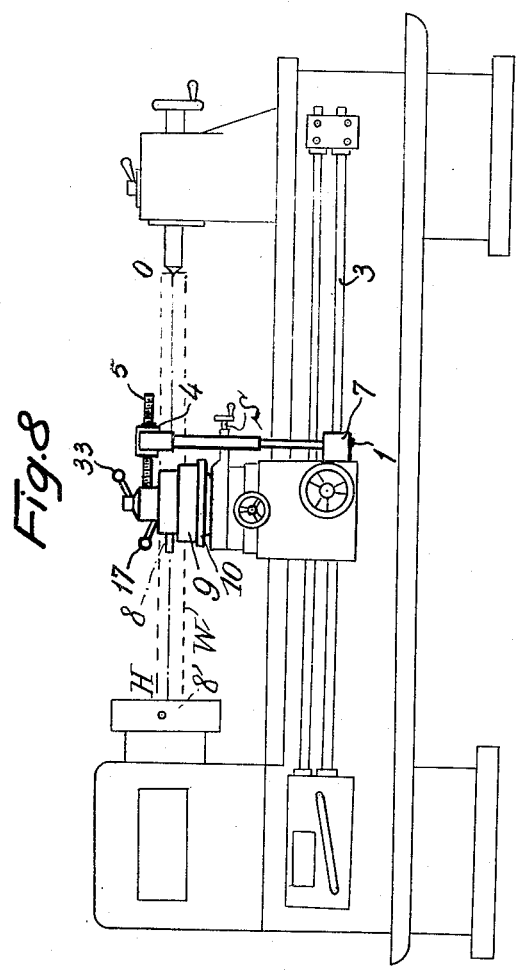

Patented Dec. 1, 1953

2,660,737

UNITED STATES PATENT OFFICE 2,660,737

LATHE ATTACHMENT FOR PROGRESSIVELY CUTTING A THREAD

Marcel Marius Escure, Bagneux, France

Application May 4, 1948, Serial No. 24,938

Claims priority, application France May 14, 1947

10 Claims. (Cl. 10—101)

The present invention deals with a semi-automatic contrivance for special use in regard to cutting of screw threads on a standard lathe.

The aim of the invention is to convert an ordinary standard type of lathe into one that is so to speak automatic, without any alteration to the actual lathe being involved by such conversion.

In one form of adaptation where the invention plays an important part, i. e. in the cutting of threads, it may be remarked that the procedure of cutting a thread depends on its shape, pitch and depth.

The shape of the thread is decided by the contour of the cutting tool and the pitch of this thread is determined by the interdependence of the movement of the particular work in which the thread is to be cut and the straight line motion of the tool, while the depth of the thread is a function of the degree of entry of the tool into the work on the lathe.

For the suitable cutting of a thread, some ingenuity must be exercised in fixing the number of cuts on the lathe, this number naturally varying in accordance with the diversity of the pitches required.

The cutting of a thread on a standard type of lathe involves the following procedure:

The tool is engaged in cutting during its forward travel;

The tool is withdrawn during its return travel to its starting point by bringing the tool back with the help of the small tool carriage moving transversally;

The motion of the carriage is reversed;

The tool is again brought into the cutting position having due regard to the next cut to be made.

These various progressive steps, as a rule, are subject to numerous repetitions before the completed job can be regarded as entirely satisfactory.

The net cost of thread-cutting performed in this way is, as may be imagined, a high figure, on account of the time involved and the essential employment of highly-skilled lathe operators.

The device that forms the object of the invention is characterised mainly by its makeup that consists of an actuating gear, a tool carriage and an adjusting device for the tool-carrier.

In addition to this, the actuating gear is associated with a part of the lathe, to which the device is fitted, preferably but not necessarily the traversing bar of this lathe, through a set of gears, of which one member slides along the traversing bar in step with the position of the saddle of the lathe, while the other member allows the sliding motion of a vertical spindle;

The tool carriage moves along a generating line of the work to be machined in view of the cutting of a thread in the forward direction of the tool, i. e. the operative stroke of the tool through the agency of a cam by which it is controlled; the carriage then is brought back on its return travel, that is the inoperative movement of the tool through a spring action. The means for adjustment include: a cam of which the contour is partly spiral-shaped and partly circular, a disc acting on the cam so as to adjust the extent of its travel, a cross-slide housed in a slide-way cut in the disc which cross-slide, carries on the one hand a kind of key, yieldingly held in contact with the cam, and on the other hand, a finger that acts as a check to a slideway; a ratchet carried by the hub of the cam, a pawl actuating this ratchet and hinged on a toothed pinion meshing with a rack gearing subjected to the action of an elastic means urging it against an adjustable stop, and means for the adjustment of the angular position of the pinion engaging the rack gearing.

The device under discussion is characterised, in addition to the main arrangements that have been set forth somewhat briefly, by further advantageous features that will be disclosed later on.

A better understanding of the invention will be obtained with the assistance of the following detailed disclosure and of the accompanying drawings that are presented in quite a diagrammatic way and only as a guide.

Fig. 1 of these drawings shows in perspective view how the actuating movement is set up, how the movement is transmitted and how the tool carrier is controlled.

Figure 2:
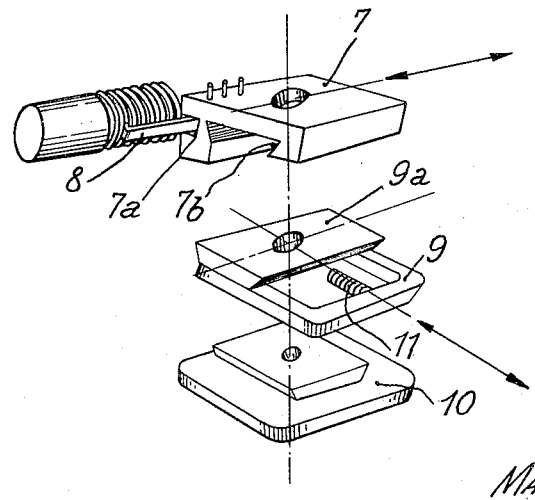

Fig. 2 shows said tool-carrier of which the various component parts have been illustrated in exploded view apart from each other for the sake of greater clarity.

Fig. 3 of the drawings shows in perspective view, partly sectionalised and partly torn off, the adjusting device for the equipment.

Figure 4:
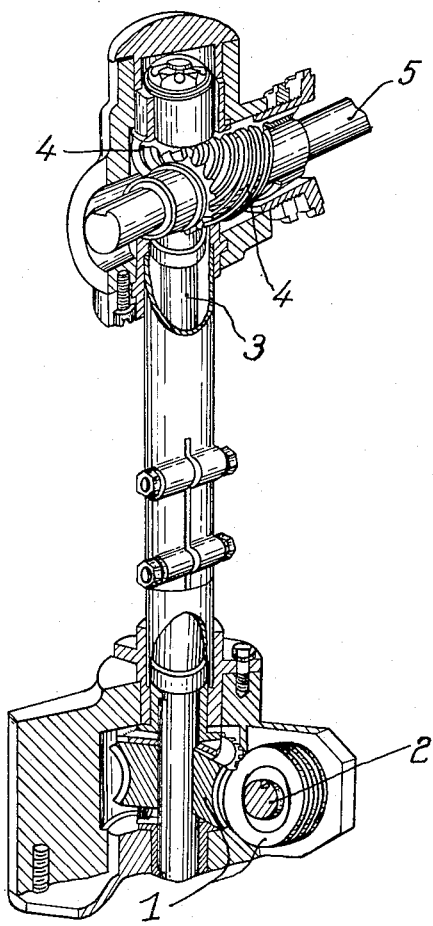

Fig. 4 of the drawings shows in a similar manner the actuating gear and associated transmission.

Figs. 5 and 6 of the drawings are assembly views partly sectionalised and partly torn off of two portions of the device that in actual practice are placed one above the other and that have only been shown as separated on the drawing so as to make the functioning of the device more readily understood.

Fig. 7 of the drawings is an elevational view of a detail of the device under discussion.

Fig. 8 is a diagrammatic showing of a lathe to which my invention has been applied.

For setting up the device shown in the drawings and assembling it on a standard type of lathe according to the invention, the procedure is as follows:

An actuating gear is constituted by a worm gear 1, of which the driving gear is slidably keyed to the feed-rod 2 of the lathe, so as to follow the changing position of the saddle of the lathe; the driven gear is slidingly keyed on a vertical spindle 3, at the top of which is a worm gear 4, the driven gear of which is slidingly secured to a spindle 5, which spindle carries at its end a further worm gear 6.

A tool-rest made up of the following members is arranged in the following manner:

A component member 7 having on its front surface a slot 7a taking the cutting tool 8 (Fig. 2); on its lower surface this member 7 is provided with a dovetailed notch 7b along a line parallel to the generating line of the part to be worked on which is paralel to the work spindle a co-operating member 9 is provided with a dovetailed projection 9a fitting into the notch 7b of the part 7. This part 9 is set with a dovetailed sliding fit on a further member 10.

The member 9 is urged always in the operative direction of the tool through some elastic means such as a coil spring, the tension of which is adjustable.

The assembly formed by the parts 7, 9 and 10 is fastened at the usual standard place of the tool holder turret of the lathe by means of a bolt.

An adjusting device defining:
(a) The extent or depth of the cut,
(b) The number of cuts;
(c) The depth of the thread to be cut includes the following members arranged in the following way (Fig. 3).

A cam 12 of which the contour is partly spiral-shaped and partly circular; in the example under discussion, this cam is spiral over 270° and circular and concentric with its axis of rotation over 90°.

A hollowed out disc 13 coaxial with the cam 12 is provided with a cross-slide 14 that carries at its end a contact-piece 14a which latter is kept rubbing permanently against the cam 12 under the action of a spring 15 working under compressional conditions; on its lower surface the cross-slide 14 carries a finger 14b engaging a shoe 16 that acts as a check for the part 9 that has been described above with reference to the tool-holder; and this shoe 16 restricts the travel forward of this part 9;

The disc 13 may turn by 90° in a horizontal plane through the agency of two cylindrical parts 17 and 18 keyed on its spindle 14c; the part 17 is furnished with a control lever 17a; the part 17 is provided with a scale allowing its setting to be adjusted.

The cam 12 is provided in the upper portion of its hub with a ratchet wheel 19, with very close teeth, that comes under the action of a pawl 20 pivotally secured to a collar provided on the hub of a pinion 21 engaging a rack-gear 22; this rack-gear is subjected to the action of a spring 23 urging it continuously against an adjustable stop 24, provided on the plate 7 of the tool-holder.

The working of this device of which the chief members have been described while some other members will be described in what follows, provides for the forward travel of the tool so that it may execute its cut; once the cut is made, the tool is retracted away from the piece being worked and returned to its starting point, the tool being caused to make a deeper cut in the work each time while the operation is stopped once the last cut is made.

The feed motion of the tool or operative travel is obtained by a spiral-shaped cam 25 (Fig. 1) that, in the example under discussion, extends over 240°, and has a dead or inoperative angle of 120°; the retraction or release of the tool is obtained by a cam 26, keyed to the same spindle as the cam 25 and also controlled by the system 2—3—5; said cam 26 has a boss extending over 120° and registering with the dead angle of cam 25. In contact with this cam 26 is provided a push rod 27 acting on a rocking-lever 28 against which bears the plate 9 of the tool holder. The return of the cutting tool to its original position is carried out by a return spring 29 that exerts a pull on the plate 9. The spindle to which the cams 25 and 26 are keyed is hollow and controlled by the worm gear 6.

The depth of cut depends on the cam 12 (Fig. 3) of which the contour is spiral over 270° and circular over an arc of 90°. During the cutting of a thread, this cam 12 makes one complete turn. The extent of its action or its lift is adjusted by means of the disc 13 the pivot of which is carried by the axial bore of the cam 12. The cross-slide 14 of this disc 13 is permanently in contact with the cam 12 through its contact-piece 14a under the action of the spring 15. The finger 14b through the agency of the shoe 16 is in contact with the member 9 and restricts its travel. The disc 13 may swing by 90° through the agency of parts 17 and 18 that rotate in unison. The control-lever 17a provides for the simultaneous rotation of the cylindrical parts 17 and 18 together with the disc 13.

These modifications in the travel of the tool obtained during one complete turn of the cam 12 in accordance with the various angular positions of the cross-slide 14 in relation to the surface of the part 10 will be restricting the degree of entry of the tool provide the various depths of thread-cutting.

The number of cuts depends on the action of the rack-gear that engages the pinion 21 to which is secured the pawl 20. The ratchet 19, as seen above, is rigid with the cam 12. The rack-gear 22 gives the pinion 21 a rocking motion that may be modified through the adjustable stop 24 rigid with the tool-holder 7.

When the cam 12 has completed its revolution as defined, its hub 12a, that is provided at its end 12b with a cam in the shape of a boss, as shown in Fig. 7 of the drawings, comes up against a countercam 18a with which the cylindrical part 18 is provided at its end as a boss-shaped counter-cam; this part 18 is then raised and through a suitable transmission that is not illustrated it draws inwardly the wire 29' of the Bowden cable so as to release the plunger 30 by causing a rocking movement of the eccentric latch 31 engaging the latter.

This plunger 30 is housed in the spindle, hollowed out for the purpose, carrying the cams 25 and 26; this plunger is subjected to the pressure of a coil spring 32 and when released as disclosed falls into an elongated stud-hole provided in the tool holder plate 7 and the tool-holder is held in its starting position.

With the help of a control-lever 33 action may be taken on the latch 31 of the plunger 30, and the latter may be released when it is desired to stop the machine during the cutting of a thread, for instance to control the work in progress.

With a view to allowing an adjustment of the lathe on which the device is assembled, for instance to cause the traversing bar to turn in the reverse direction, without the danger of any damage to the device, the driving shaft of the cams 25 and 26 is cut and its two sections are given cooperating ratchet-teeth, which ensures that driving is only possible in one direction of rotation. The keeping of these two cut portions in contact is ensured by a coil spring 34.

The invention is not restricted to its adaptation for thread-cutting that has been considered more especially hereinabove and it covers all those applications and modifications falling within the scope of accompanying claims. Neither is the invention tied down to the form of execution that has been more particularly set forth and illustrated and it covers, of course, all its modifications falling within the scope of said accompanying claims. The gist of the invention resides thus in the fact that as illustrated in diagrammatic Fig. 8 there is secured to the standard lathe carrier, instead of the standard tool carrying turret, an arrangement of the type described whereof the member 10 is rigidly secured to the turret carrier by a screw S that serves normally for securing the turret while the worm gear 1 is fitted over the feed rod or traversing bar 2 of the standard lathe. This being done, it will be readily ascertained that the rotation of the feed rod controls the movement of the carriage 9 towards and away from the work W facing the tool 8 and revolving with its spindle 8′ between the head and tail stocks H and T.

The adjustments according to the invention are provided by the two stops of which one is constituted by the adjustable member 24 on the tool-holder 7 that shifts at the end of each longitudinal forward travel of the lathe carriage and tool-carrier the rack 22 by an amount such as will cause the pinion 22 to revolve by a corresponding number of tooth intervals as provided by the adjustment of the stop 24. Consequently the cam 12 revolves by an angular distance corresponding to a subdivision of its travel into the number of cuts to be provided. On the other hand, the depth of the successive cuts is defined by the stop 16 engaging the travelling carriage 9 at the end of the operative stroke of the latter, the position of said stop 16 being adjusted by the angular movement of the rigid system 17a, 17—18, 13—14a. It is thus apparent that the two said adjustments provide for the depth of cut and number of cuts independently of the actual control mechanism provided by the transmission 1—6.

What I claim is:

1. An attachment for a lathe having a bed, a work-spindle and a feed rod, for converting said lathe into an automatic screw-cutting lathe comprising a tool-carrying system including a first carriage adapted to reciprocate over the bed in a direction perpendicular to the work spindle, a second tool-holder carriage adapted to slide over the first carriage in a direction parallel to said work spindle, rotary means connectible with the feed rod of the lathe and controlling the reciprocating movement of the carriages, yielding means urging the carriages back into their starting positions, a stop adapted to be shifted by the second carriage at each progression of the latter, a stop for the movement of the first carriage and a mechanism interconnecting operatively the two stops to shift the second stop by an amount defined by the progression of the first stop.

2. An attachment for a lathe having a bed, a work-spindle and a feed rod, for converting said lathe into an automatic screw-cutting lathe comprising a tool-carrying system including a first carriage adapted to reciprocate over the bed in a direction perpendicular to the work spindle, a second tool-holder carriage adapted to slide over the first carriage in a direction parallel to said work spindle, rotary means connectible with the feed rod of the lathe and controlling the reciprocating movement of the carriages, yielding means urging the carriages back into their starting positions, a stop adapted to be shifted by the second carriage at each progression of the latter, a stop for the movement of the first carriage and a mechanism interconnecting operatively the two stops to shift the second stop by an amount defined by the progression of the first stop and hand-adjustable means adapted to modify the setting of the second stop.

3. An attachment for a lathe having a bed, a work spindle, and a feed rod for converting said lathe into an automatic screw-cutting lathe comprising a tool-carrying system including a first carriage adapted to reciprocate over the bed in a direction perpendicular to the work spindle, a second tool-holder carriage adapted to slide over the first carriage in a direction parallel to said work spindle, rotary means connectible with the feed rod of the lathe and controlling the reciprocating movement of the carriages, yielding means urging the carriages back into their starting positions, a rotary cam, an adjustable stop carried by the second carriage, means operatively cooperating with said stop and adapted to make said cam progress at each reciprocation of the second carriage by one angular step of a magnitude defined by the stroke allowed for the stop engaging said means, an adjustable stop associated with the rotary cam and adapted to define the end of the stroke of the first carriage at the end of each revolution of the cam corresponding to a number of reciprocations of the first carriage depending on the magnitude of the angular step of the cam provided at each reciprocation of the second carriage.

4. An attachment for a lathe having a bed, a work-spindle and a feed rod for converting said lathe into an automatic screw-cutting lathe comprising a tool-carrying system including a first carriage adapted to reciprocate over the bed in a direction perpendicular to the work spindle, a second tool-holder carriage adapted to slide over the first carriage in a direction parallel to said work spindle, rotary means connectible with the feed rod of the lathe and controlling the reciprocating movement of the carriages, yielding means urging the carriages back into their starting positions, a rotary cam, means carried by the second carriage and adapted to make said cam progress by one angular step for each operative stroke of the second carriage until said cam has executed an entire revolution, adjustable means associated with last mentioned means for defining the allowed stroke of the second carriage, a plate coaxial with said rotary cam and revoluble with reference thereto and provided with a transverse slideway adapted for a predetermined angular position of the plate to lie in parallelism with the direction of movement of the first carriage, hand controlled means for angularly shifting said plate with reference to said cam, a slider adapted to move in the plate slideway and including a lateral projection engaging the cam periphery on the side thereof further from the first carriage, means for yieldingly urging said projection against the cam, and a stop rigid with the slider and adapted to form at the end of each revolution of the cam an abutment for the movement of the first carriage to define the depth of cut in accordance with the angular setting of the plate and consequent shifting of the last mentioned stop along a direction parallel to the directions of progression of said first carriage.

5. An attachment for a lathe having a bed, a work spindle, and a feed rod for converting said lathe into an automatic screw-cutting lathe comprising a tool-carrying system including a first carriage adapted to reciprocate over the bed in a direction perpendicular to the work spindle, a second tool holder carriage adapted to slide over the first carriage in a direction parallel to said work spindle, rotary means connectible with the feed rod of the lathe and controlling the reciprocating movement of the carriages, yielding means urging the carriages back into their starting positions, a rotary cam, a ratchet wheel coaxial with the rotary cam and rigid therewith, a catch adapted to engage the ratchet wheel, a pinion body coaxial with the ratchet wheel and revoluble with reference thereto to which the catch is pivotally secured and including a peripheral series of teeth, a rack meshing with the pinion teeth for defining the angular position of said pinion and extending in parallelism with the direction of reciprocation of the second carriage, a stroke limiting stop adjustably carried by said second carriage in the path of said rack and cooperating with the latter to shift the rack forwardly by one step at the end of each operative movement of said second carriage and to make thereby the cam progress by one angular step, yielding means for urging the rack back against the stop on the second carriage, an adjustable stop associated with the rotary cam and adapted to define the end of the stroke of the first carriage at the end of each revolution of the cam corresponding to a number of reciprocations of the first carriage.

6. An attachment for a lathe having a bed, a work spindle and a feed rod for converting said lathe into an automatic screw-cutting lathe comprising a tool-carrying system including a first carriage adapted to reciprocate over the bed in a direction perpendicular to the work spindle, a second tool-holder carriage adapted to slide over the first carriage in a direction parallel to said work spindle, rotary means connectible with the feed rod of the lathe and controlling the reciprocating movement of the carriages, yielding means urging the carriages back into their starting positions, a rotary cam, an adjustable stop carried by the second carriage, means operatively cooperating with said stop and adapted to make said cam progress at each reciprocation of the second carriage by one angular step of a magnitude defined by the stroke allowed for by the stop engaging said means, an adjustable stop associated with the rotary cam and adapted to define the end of the stroke of the first carriage at the end of each revolution of the cam corresponding to a number of reciprocations of the first carriage depending on the magnitude of the angular step of the cam provided at each reciprocation of the second carriage, a longitudinally shiftable cam controlled by the rotation of the first-mentioned rotary cam, a rod adapted to lock the second carriage, yielding means urging said rod away from its operative position and means controlled by the longitudinally shiftable cam and adapted to act on said yielding means for releasing the locking rod and allowing the latter to lock the second carriage when said cam has executed its complete revolution.

7. An attachment for a lathe having a bed, a work spindle, and a feed rod for converting said lathe into an automatic screw-cutting lathe comprising a tool-carrying system including a first carriage adapted to reciprocate over the bed in a direction perpendicular to the work spindle, a second tool-holder carriage adapted to slide over the first carriage in a direction parallel to said work spindle, rotary means connectible with the feed rod of the lathe and means controlling the reciprocating movement of the carriages, yielding means urging the carriages back into their starting positions, a rotary cam, a ratchet wheel coaxial with the rotary cam and rigid therewith, a catch adapted to engage the ratchet wheel, a pinion body coaxial with the ratchet wheel and revoluble with reference thereto to which the catch is pivotally secured and including a peripheral series of teeth, a rack meshing with the pinion teeth for defining the angular position of said pinion and extending in parallelism with the direction of reciprocation of the second carriage, a stroke limiting stop adjustably carried by said second carriage in the path of said rack and cooperating with the latter to shift the rack forwardly by one step at the end of each operative movement of said second carriage and to make thereby the cam progress by one angular step, yielding means for urging the rack back against the stop on the second carriage, an adjustable stop associated with the rotary cam and adapted to define the end of the stroke of the first carriage at the end of each revolution of the cam corresponding to a number of reciprocations of the first carriage, a longitudinally shiftable cam controlled by the rotation of the first mentioned rotary cam, a rod adapted to lock the second carriage, yielding means urging said rod away from its operative position and means controlled by the longitudinally shiftable cam and adapted to act on said yielding means for releasing the locking rod and allowing the latter to lock the second carriage when said cam has executed its complete revolution.

8. An attachment for a lathe having a bed, a work spindle and a feed rod for converting said lathe into an automatic screw-cutting lathe comprising a tool-carrying system including a first carriage adapted to reciprocate over the bed in a direction perpendicular to the work spindle, a second tool-holder carriage adapted to slide over the first carriage in a direction parallel to said work spindle, rotary means connectible with the feed rod of the lathe and controlling the reciprocating movement of the carriages, yielding means urging the carriages back into their starting position, a rotary cam, a ratchet wheel coaxial with the rotary cam and rigid therewith, a catch adapted to engage the ratchet wheel, a pinion body coaxial with the ratchet wheel and revoluble with reference thereto to which the catch is pivotally secured and including a peripheral series of teeth, a rack meshing with the pinion teeth for defining the angular position of said pinion and extending in parallelism with the direction of reciprocation of the second carriage, a stroke limiting stop adjustably carried by said second carriage in the path of said rack and cooperating with the latter to shift the rack forwardly by one step at the end of each operative movement of said second carriage and to make thereby the cam progress by one angular step, yielding means for urging the rack back against the stop on the second carriage, a plate coaxial with said rotary cam and revoluble with reference thereto and provided with a transverse slideway adapted for a predetermined angular position of the plate to lie in parallelism with the direction of the movement of the first carriage, hand controlled means for angularly shifting said plate with reference to said cam, a slider adapted to move in the plate slideway and including a lateral projection engaging the cam periphery on the side thereof further from the first carriage, means for yieldingly urging said projection against the cam and a stop rigid with the slider and adapted to form at the end of each revolution of the cam an abutment for the movement of the first carriage to define the depth of cut in accordance with the angular setting of the plate and consequent shifting of the last mentioned stop along a direction parallel to the direction of progression of said carriage.

9. An attachment for a lathe having a bed, a work spindle and a feed rod for converting said lathe into an automatic screw-cutting lathe comprising a tool-carrying system including a first carriage adapted to reciprocate over the bed in a direction perpendicular to the work spindle, a second tool-holder carriage adapted to slide over the first carriage in a direction parallel to said work spindle, rotary means connectible with the feed rod of the lathe and means controlling the reciprocating movement of the carriages, yielding means urging the carriages back into their starting positions, a rotary cam, an adjustable stop carried by the second carriage, means operatively cooperating with said stop and adapted to make said cam progress at each reciprocation of the second carriage by one angular step of a magnitude defined by the stroke allowed for by the stop engaging said means, an adjustable stop associated with the rotary cam and adapted to define the end of the stroke of the first carriage at the end of each revolution of the cam corresponding to a number of reciprocations of the first carriage depending on the magnitude of the angular step of the cam provided at each reciprocation of the second carriage, a longitudinally shiftable cam controlled by the rotation of the first mentioned rotary cam, a rod adapted to lock the second carriage, yielding means urging said rod away from its operative position and means controlled by the longitudinally shiftable cam and adapted to act on said yielding means for releasing the locking rod and allowing the latter to lock the second carriage when said cam has executed its complete revolution and hand-controlled means for positively controlling the locking rod independently of the action of the longitudinally shiftable cam.

10. An attachment for a nonautomatic lathe having a bed, a work spindle, and a carriage feed rod for converting said lathe into an automatic screw-cutting lathe comprising a tool-carrying member including a first carriage adapted to reciprocate over the bed in a direction perpendicular to the work spindle, a second tool-holder carriage adapted to slide over the first carriage in a direction parallel to said work spindle, rotary means connectible with the feed rod of the lathe and including two shafts, a worm gear operatively engaging the shafts with one another and the first of which shafts is controlled by the feed rod, a cam rigid with the second shaft and adapted to control the operative movement of the first carriage and a further cam carried by the second shaft controlling the return movement of said carriage, yielding means urging the carriages back into their starting positions, a rotary cam, an adjustable stop carried by the second carriage, means operatively engaging said stop and adapted to make said cam progress at each reciprocation of the second carriage by one angular step of a magnitude defined by the stroke allowed for by the stop upon engaging said means, an adjustable stop associated with the rotary cam and adapted to define the end of the stroke of the first carriage at the end of each revolution of the cam corresponding to a number of reciprocations of the first carriage.

MARCEL MARIUS ESCURE.

References Cited in the file of this patent

UNITED STATES PATENTS

| Number | Name | Date |
|---|---|---|
| 9,677 | Newbury | Apr. 19, 1853 |
| 177,282 | Rogers | May 9, 1876 |
| 852,641 | Vogetstang | May 7, 1907 |
| 1,763,635 | Townsend | June 10, 1930 |
| 2,265,265 | Castelli | Dec. 9, 1941 |
| 2,399,621 | Bodmer | May 7, 1946 |
| 2,468,478 | Ardoin | Apr. 26, 1949 |
| 2,576,570 | Castelli | Nov. 27, 1951 |

FOREIGN PATENTS

| Number | Country | Date |
|---|---|---|
| 464,342 | Great Britain | Apr. 15, 1937 |